(12) United States Patent
Chang

(10) Patent No.: US 6,871,812 B1
(45) Date of Patent: Mar. 29, 2005

(54) MULTI-STAGES RETRACTABLE COILING CORD DEVICE

(76) Inventor: Wen-Han Chang, PO Box 82-144, Taipei (TW)

(*) Notice: Subject to any disclaimer, the term of this patent is extended or adjusted under 35 U.S.C. 154(b) by 0 days.

(21) Appl. No.: 10/759,066

(22) Filed: Jan. 20, 2004

(51) Int. Cl.⁷ .............................................. B65H 75/48
(52) U.S. Cl. ................................ 242/378.1; 242/385.4; 191/12.4
(58) Field of Search ................. 174/69; 242/378.1–3, 242/381.3, 382, 382.1, 385.1, 385.4, 388; 191/12.2 R, 12.4

(56) References Cited

U.S. PATENT DOCUMENTS

| | | | | |
|---|---|---|---|---|
| 3,657,491 A | * | 4/1972 | Ryder et al. ........... | 191/12.2 R |
| 3,705,962 A | * | 12/1972 | Banister .................. | 242/378.1 |
| 6,199,674 B1 | * | 3/2001 | Liao ........................... | 191/12.4 |
| 6,273,354 B1 | * | 8/2001 | Kovacik et al. ....... | 191/12.2 R |
| 6,276,502 B1 | * | 8/2001 | Leyba et al. ........... | 174/69 |
| 6,616,080 B1 | * | 9/2003 | Edwards et al. ....... | 242/378.1 |
| 6,682,008 B2 | * | 1/2004 | Yeh .......................... | 242/378.1 |

* cited by examiner

*Primary Examiner*—Dean A. Reichard
*Assistant Examiner*—Adolfo Nino
(74) *Attorney, Agent, or Firm*—Leong C. Lei

(57) ABSTRACT

A multi-stages retractable coiling cord is disclosed. The coiling cord comprises a front cover, a spiral spring, a sliding disc, a retraction cord, a positioning bead and a rear cover. The cord is retracted and is positioned once when the sliding disc rotates once. A slight pull will allow the coiling cord to release from engaging.

1 Claim, 5 Drawing Sheets

MULTI-STAGES RETRACTABLE COILING CORD DEVICE

BACKGROUND OF THE INVENTION (a) Technical Field of the Invention

The present invention relates to a coiling cord, and in particular, to a coiling cord used in a computer mouse such that an appropriate cord is retracted and positioned to facilitate application.

(b) Brief Description of the Prior Art

The length of a cord connecting a mouse to a computer is always fixed and it cannot be adjusted to comply with the need of the user. Accordingly, it is very often that the length is either too long or too short and therefore, it is rather troublesome in controlling the mouse. Conventional way of providing an appropriate length of the cord connecting to a computer mouse is by coiling the cord manually a plurality of rounds and is then tighten with a rubber band or a thread. However, the fight tied end of the cord may affect the quality of the cord during application. Accordingly, it is an object of the present invention to provide a multi-stages retractable coiling cord device which mitigates the above drawbacks. The retractable coiling cord provides a high quality and efficient application.

SUMMARY OF THE INVENTION

It is an object of the present invention is to provide a multi-stages retractable coiling cord which allows an appropriate length of the cord to be retracted automatically.

Still another object of the present invention is to provide a multi-stages retractable coiling cord device, wherein the appropriate length of the cord can be accurately positioned.

A further object of the present invention is to provide a multi-stages retractable coiling cord device, wherein the retractable cord can be easily and rapidly restored to its original position for easy operation.

Yet still another object of the present invention is to provide a multi-stages retractable coiling cord device, wherein the retractable coiling cord device can be made into a miniature unit.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
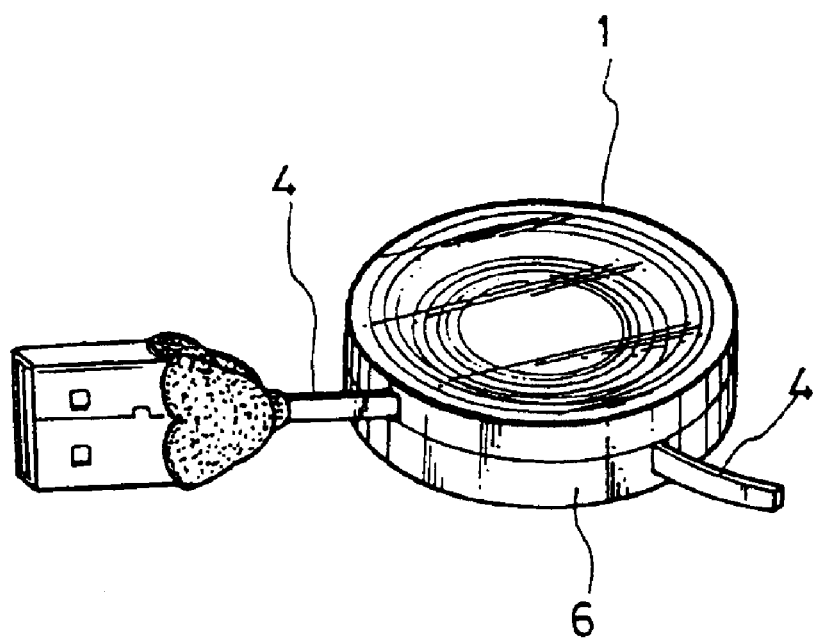
FIG. 1 is a perspective view of a coiling retractable cord of a preferred embodiment in accordance with the present invention.
Figure 2:
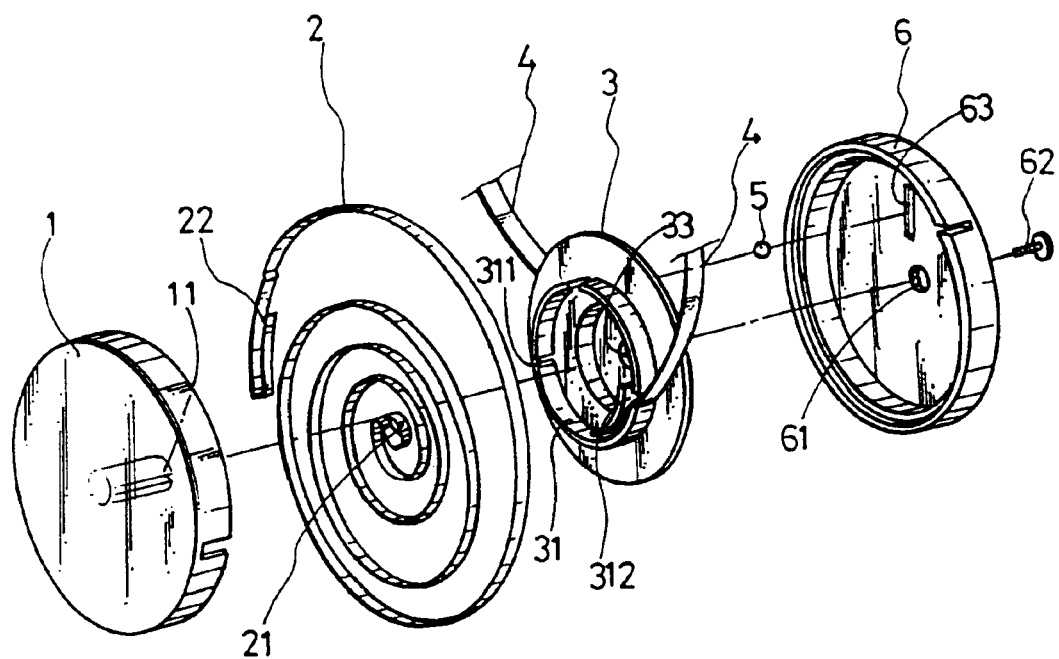
FIG. 2 is an exploded perspective view of the coiling retractable cord of the present invention.

Referring to FIGS. 1 and 2, the retractable coiling cord device comprises a front cover 1, a spiral spring 2, a sliding disc 3, a retraction cord 4, a positioning cord 5 and a rear cover 6. The spiral spring 2 is inserted within the front direction edge seat 31 of the sliding disc 3 and has a center end 21 in engagement with the center shaft 11 of the inner edge of the front cover 1. The external edge end of the spiral spring 2 is provided with a bending section 22 to be inserted into the edge slit 311 at the edge seat 31 of the sliding disc and is engaged at the circumferential wall of the edge seat 31 such that the spiral spring 2 is restricted between the front cover 1 and the sliding disc 3 with respect to the center end 21 and the bending section 22 at the external edge end. Thus, the automatic rotation in a front direction or a rear direction, the spiral spring is always at a taut situation.

Figure 3:
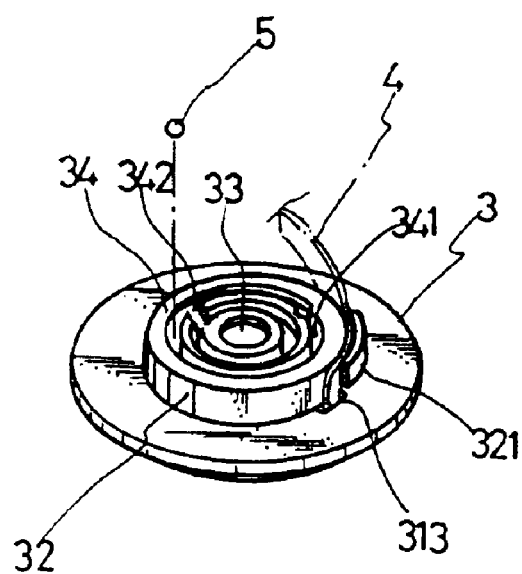
FIG. 3 is a perspective view of the sliding disc of the coiling retractable cord of the present invention.

Referring to FIG. 3, the sliding disc 3 has a front direction edge seat 31 and a rear direction edge seat 32, and the front direction edge seat 31 has a through hole 313 provided on a blocking plate 312 to allow the retraction cord 4 to pass to the rear direction face and the retraction cord 4 is formed into a front direction retraction cord 4 and rear direction retraction cord with different face. The retraction cord 4 is rolled at the external edge at the front direction edge seat 31 and the rear direction edge seat 32.

Figure 5:
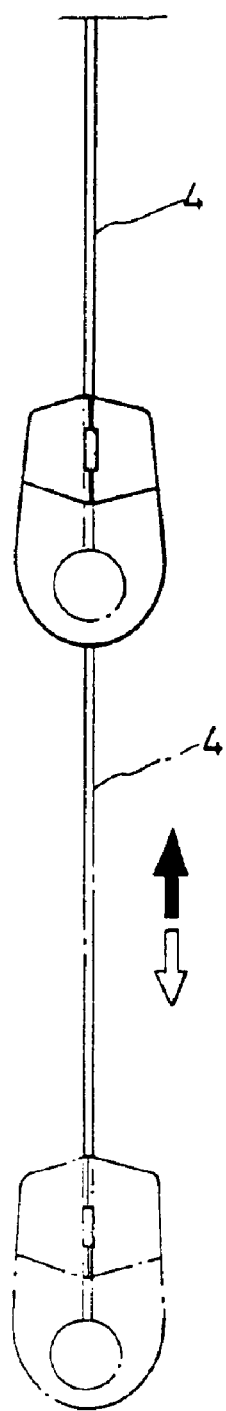
FIG. 5 is a schematic view showing the retracting movement of a computer mouse in accordance with the present invention.

The front direction retraction cord 4 and the rear direction retraction cord 4 are of same cord and are of equal length. The retraction cord 4 uses the clip plate 321 to secure the rear direction retraction cord 4 such that the front direction retraction cord 4 will not enter into the range of the rear direction retraction cord 4 due to pulling force and the rear direction retraction cord 4 will not enter the range of the front direction retraction cord 4. In other words, the lengths for both the cord are always equal. Accordingly, when the front direction retraction cord 4 is pulled, its rear direction retraction cord 4 is retracted. When the front direction retraction cord 4 is at the restored position and the rear direction retraction cord 4 is at a coiled position. The front direction retraction cord 4 and the rear direction retraction cord 4 are of equal length and are of corresponding movement. Thus, when the retraction cord 4 is pulled, the retraction cord 4 at other direction will not be affected and when the cord 4 is positioned at the final position, it will be secured by the clip plate 321. Thus, the front direction retraction cord end can be an externally connected conductive end or transmission end, and the conductive end extended from the rear direction retraction cord 4 and is connected to the interior of an object, as shown in FIG. 5.

Figure 4:
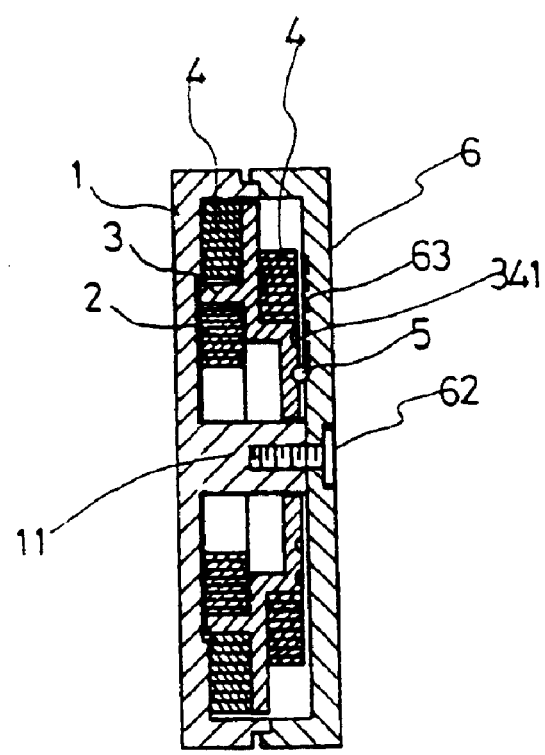
FIG. 4 is a sectional view of the coiling retractable coiling cord of the present invention.

Referring to FIGS. 2 and 4, the front cover 1 has a center shaft 11 at the inner edge to pivotally mount to the center hole 33 of the sliding disc 3. A screw nut 62 passing through the center hole 61 of the rear cover 6 is used for locking so that the sliding disc 3 is restricted between the front cover 1 and the rear cover 6 to form a self rotatable mechanism. Thus, when the front direction retractable cord 4 is pulled, which is equivalent to rotating the sliding disc 3 and when the front direction retractable cord 4 is restored to its original position, the sliding disc 3, due to the rear direction rotation of the spiral spring 2 will pull out the retraction cord 4. In addition, there is a positioning slot 341 on the rear direction seat 34 of the sliding disc 3 and the railing slot 341 is provided with a limiting end 342, and the positioning bead 5 is positioned at the corresponding limiting slot 63 corresponding to the rear cover 6 such that the positioning bead 5 is only positioned at the limiting slot 63 to produce the up and down reciprocation movement. Thus, when the front direction retraction cord 4 pulls the sliding disc to move one round, a positioning mechanism is generated. If the retraction cord 4 is pulled to exceed the second positioning structure, the next positioning is achieved subsequently. Accordingly, the present invention allows multiple stages of positioning when the retraction cord is pulled or retracted.

It will be understood that each of the elements described above, or two or more together ray also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A retractable coiling cord device comprising a front cover, a spiral spring, a sliding disc, a retraction cord, a positioning bead and a rear cover, characterized in that the front cover having an inner edge with a center shaft for engaging the center end of the spiral spring is mounted with the rear cover using a screw nut via a center hole of the sliding disc; the spiral spring is positioned within a front edge seat of the sliding disc and has a center end to engage with a center shaft of the front cover and a bending section at the outer edge end of the spiral spring is positioned at a circumferential wall of the front edge seat so that the spiral spring is restricted between the front cover and the sliding disc; the sliding disc has with a center hole and a disc body has a front edge seat and a rear edge seat and the front edge seat uses a through hole provided on a blocking plate to lead the retraction cord to the rear edge seat so that the retraction cord is formed into a front direction retraction cord and a rear direction cord and the external edge of the rear edge seat is provided with a clip plate, and the rear edge seat is provided with a limiting end with a positioning slot and a railing slot for the positioning of the positioning bead; the retraction cord is being retracted via the through hole of the sliding disc to the rear edge seat such that the retraction cord is formed into the front direction cord and the rear direction cord and is secured at the middle position by the clip plate provided at the outer edge of the rear edge seat; the positioning bead is positioned at the limiting slot of the rear cover and the limiting end at the positioning slot and the railing slot; the rear end is locked to the front cover by a screw nut and the inner face of the rear cover is provided with the limiting slot for positioning the positioning bead to reciprocate up and down; the positioning slot on the sliding disc and the limiting end of the railing slot produce one positioning mechanism when the retraction cord rotates one round; the retraction cord is divided into a front direction retraction cord and a rear direction retraction cord; a front direction retraction cord end is a conductive end or a transmission end, and a rear direction retraction cord end is connected to the interior of an object.

\* \* \* \* \*